(12) United States Patent
Pan et al.

(10) Patent No.: US 11,871,052 B1
(45) Date of Patent: Jan. 9, 2024

(54) MULTI-BAND RATE CONTROL

(71) Applicant: Apple Inc., Cupertino, CA (US)

(72) Inventors: Hao Pan, Sunnyvale, CA (US); Haitao Guo, Cupertino, CA (US); Ke Chen, Sunnyvale, CA (US); Francesco Iacopino, Los Gatos, CA (US); Jim C. Chou, San Jose, CA (US); Xiaohua Yang, San Jose, CA (US); Linfeng Guo, Cupertino, CA (US); Munehiro Nakazato, San Jose, CA (US); Krishnakanth Rapaka, San Jose, CA (US); Ye Cong, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/580,184

(22) Filed: Sep. 24, 2019

Related U.S. Application Data

(60) Provisional application No. 62/737,470, filed on Sep. 27, 2018.

(51) Int. Cl.
*G06F 15/16* (2006.01)
*H04N 21/2343* (2011.01)
*G02B 27/00* (2006.01)
*G06T 19/00* (2011.01)
*H04N 21/2662* (2011.01)

(52) U.S. Cl.
CPC ..... *H04N 21/2343* (2013.01); *G02B 27/0093* (2013.01); *G06T 19/006* (2013.01); *H04N 21/2662* (2013.01)

(58) Field of Classification Search
CPC ............ H04N 21/2343; H04N 21/2662; G06T 19/006; G02B 27/0093
USPC .......... 709/231; 375/240.12, 240.19, 240.02, 375/240.03, 260, 285; 370/230; 725/9; 382/159, 251, 233, 237, 166; 455/519, 455/518, 452.2, 69, 63.1, 456.1, 426.1
See application file for complete search history.

(56) References Cited

U.S. PATENT DOCUMENTS

| 6,094,455 | A  | * | 7/2000 | Katta ................... H04N 19/177 375/E7.218 |
| 6,937,767 | B1 | * | 8/2005 | Burak ..................... G06T 9/007 382/232 |
| 7,362,798 | B1 | * | 4/2008 | Starnberger ........ H04L 27/2608 375/130 |
| 9,854,020 | B1 | * | 12/2017 | Kum ..................... H04L 65/752 |

(Continued)

FOREIGN PATENT DOCUMENTS

| EP | 0971542 A2 | 12/2000 |
| WO | 2003107683 A1 | 12/2003 |

*Primary Examiner* — Thuong Nguyen
(74) *Attorney, Agent, or Firm* — Fernando & Partners, LLP (57) ABSTRACT

In one implementation, a method of generating a bit stream encoding a video stream is performed by a device including one or more processors and non-transitory memory. The method includes decomposing a video stream into a plurality of frequency band video streams. The method includes determining a target bitrate and determining, for each frequency band video stream, a respective frequency band bit rate based on the target bit rate. The method includes encoding each of the plurality of frequency band video streams at its respective frequency band bit rate and transmitting, over a channel, each encoded frequency band video stream.

20 Claims, 8 Drawing Sheets

(56) References Cited

U.S. PATENT DOCUMENTS

| | | | | |
|---|---|---|---|---|
| 2003/0112851 A1* | 6/2003 | Aust | | H04B 1/707 375/141 |
| 2003/0176196 A1* | 9/2003 | Hall | | G01S 5/0205 455/456.1 |
| 2004/0001635 A1* | 1/2004 | Van Der Schaar | | H04N 21/25808 382/233 |
| 2004/0233844 A1* | 11/2004 | Yu | | H04L 12/5602 370/395.21 |
| 2004/0264568 A1* | 12/2004 | Florencio | | H04N 19/63 375/240.12 |
| 2005/0141630 A1* | 6/2005 | Catreux | | H04L 1/0054 375/267 |
| 2006/0205357 A1* | 9/2006 | Kim | | H04L 1/0656 455/69 |
| 2007/0010256 A1* | 1/2007 | Klabunde | | G16H 40/67 455/452.2 |
| 2007/0105579 A1* | 5/2007 | Shaffer | | H04L 65/605 455/519 |
| 2008/0240251 A1* | 10/2008 | Gioia | | G06T 9/001 375/240.19 |
| 2008/0261551 A1* | 10/2008 | Catreux-Erceg | | H04B 7/0848 455/272 |
| 2009/0023469 A1* | 1/2009 | Tomioka | | H04W 48/16 455/552.1 |
| 2009/0310673 A1* | 12/2009 | Chung | | H04N 19/14 375/240.03 |
| 2010/0310188 A1* | 12/2010 | Richter | | H04N 19/647 382/251 |
| 2011/0051806 A1* | 3/2011 | Lee | | H04N 19/126 375/240.03 |
| 2011/0129025 A1* | 6/2011 | Jaeckel | | H03M 13/356 375/260 |
| 2012/0170646 A1 | 7/2012 | Baylon et al. | | |
| 2012/0195369 A1* | 8/2012 | Guerrero | | H04N 19/142 375/E7.126 |
| 2012/0327998 A1* | 12/2012 | Nilsson | | H04N 19/166 375/E7.126 |
| 2013/0058393 A1 | 3/2013 | Soroushian | | |
| 2013/0081071 A1* | 3/2013 | Lindegren | | H04L 65/80 725/9 |
| 2013/0308853 A1* | 11/2013 | Wang | | G06T 11/60 382/159 |
| 2014/0064361 A1* | 3/2014 | Karczewicz | | H04N 19/30 375/240.03 |
| 2014/0139733 A1* | 5/2014 | MacInnis | | H04N 19/154 348/441 |
| 2014/0241415 A1* | 8/2014 | Su | | H04N 21/23424 375/240.02 |
| 2014/0254709 A1* | 9/2014 | Flowers | | H04L 1/0045 375/285 |
| 2014/0321561 A1* | 10/2014 | Stec | | G06T 7/11 375/240.26 |
| 2015/0071447 A1* | 3/2015 | Sen | | G10L 19/008 381/23 |
| 2015/0281025 A1* | 10/2015 | Wallbaum | | H04L 43/062 370/252 |
| 2016/0295250 A1* | 10/2016 | Yang | | H04N 21/234363 |
| 2016/0337680 A1* | 11/2016 | Kalagi | | H04N 21/23439 |
| 2017/0041652 A1* | 2/2017 | Ko | | H04N 19/132 |
| 2017/0063497 A1* | 3/2017 | Paniconi | | H03M 13/356 |
| 2017/0085616 A1* | 3/2017 | Botsford | | H04L 65/70 |
| 2017/0093942 A1* | 3/2017 | Danielsson | | H04N 21/6131 |
| 2018/0027239 A1* | 1/2018 | Fremlin | | H04N 19/154 375/240.02 |
| 2018/0192088 A1* | 7/2018 | Martin | | H04N 21/41407 |
| 2018/0270528 A1* | 9/2018 | Diggins | | H04N 5/91 |
| 2018/0367799 A1* | 12/2018 | Carmel | | H04N 19/103 |
| 2019/0253763 A1* | 8/2019 | Beheydt | | H04N 21/2343 |
| 2019/0289296 A1* | 9/2019 | Kottke | | H04N 19/179 |
| 2019/0327496 A1* | 10/2019 | Lin | | H04N 21/234363 |
| 2019/0387237 A1* | 12/2019 | Phillips | | H04N 19/107 |

* cited by examiner

```
┌─────────────────────────────────────────────────────────────┐
│ Decompose a video stream into a plurality of frequency band │──710
│ video streams                                               │
└─────────────────────────────────────────────────────────────┘
                              │
                              ▼
┌─────────────────────────────────────────────────────────────┐
│             Determine a target bit rate                     │──720
└─────────────────────────────────────────────────────────────┘
                              │
                              ▼
┌─────────────────────────────────────────────────────────────┐
│ Determine, for each frequency band video stream, a          │──730
│ respective frequency band bit rate based on the target bit  │
│ rate                                                        │
└─────────────────────────────────────────────────────────────┘
                              │
                              ▼
┌─────────────────────────────────────────────────────────────┐
│ Encode each of the plurality of frequency band video        │──740
│ streams at its respective frequency band bit rate           │
└─────────────────────────────────────────────────────────────┘
                              │
                              ▼
┌─────────────────────────────────────────────────────────────┐
│ Transmit, over a channel, each encoded frequency band       │──750
│ video stream                                                │
└─────────────────────────────────────────────────────────────┘
```

Figure 7

MULTI-BAND RATE CONTROL

CROSS-REFERENCE TO RELATED APPLICATIONS

This application claims priority to U.S. Provisional Patent App. No. 62/737,470, filed on Sep. 27, 2018, which is hereby incorporated by reference in its entirety.

TECHNICAL FIELD

The present disclosure generally relates to transmitting a bit stream encoding a video stream, and in particular, to systems, methods, and devices for controlling the bit rate of such a video stream.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting a CGR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Providing a CGR experience can be computationally expensive, particular as video data is manipulated. Accordingly, in various implementations, a head-mounted device, to reduce the amount of computation performed at the head-mounted device, receives video data from a controller which generates and/or processes the video data.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for transmitting a bit stream encoding a video stream. In various implementations, the method is performed at a device including one or more processors and non-transitory memory. The method includes decomposing a video stream into a plurality of frequency band video streams. The method includes determining a target bitrate and determining, for each frequency band video stream, a respective frequency band bit rate based on the target bit rate. The method includes encoding each of the plurality of frequency band video streams at its respective frequency band bit rate and transmitting, over a channel, each encoded frequency band video stream.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, a controller transmits a bit stream encoding a video stream to an electronic device (e.g., a head-mounted device). In transmitting the bit stream, the controller transmits a plurality of frequency band bit streams corresponding to encoded frequency band video streams generated by decomposing the video stream in frequency. The controller determines a respective frequency band bit rate for each of the frequency band video streams which change as channel conditions change.

Figure 1:
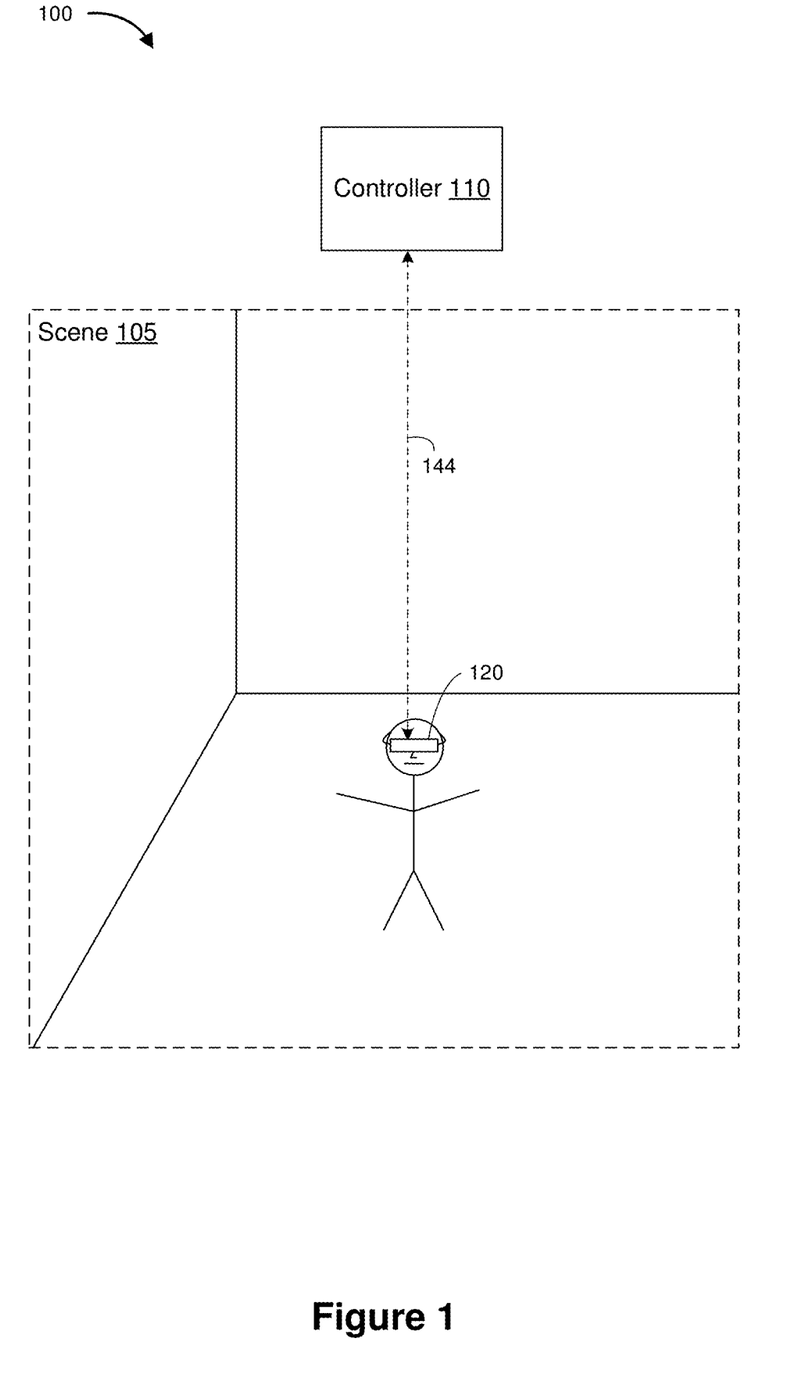
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an HMD 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In various implementations, the scene 105 is a physical environment. In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to provide the CGR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 provides a CGR experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting AV content, the HMD 120 is configured to present elements of the real world, or representations thereof, combined with or superimposed over a user's view of a computer-simulated environment. In some implementations, while presenting a VR experience, the HMD 120 is configured to present VR content.

In some implementations, the user wears the HMD 120 on his/her head. As such, the HMD 120 includes one or more CGR displays provided to display the CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
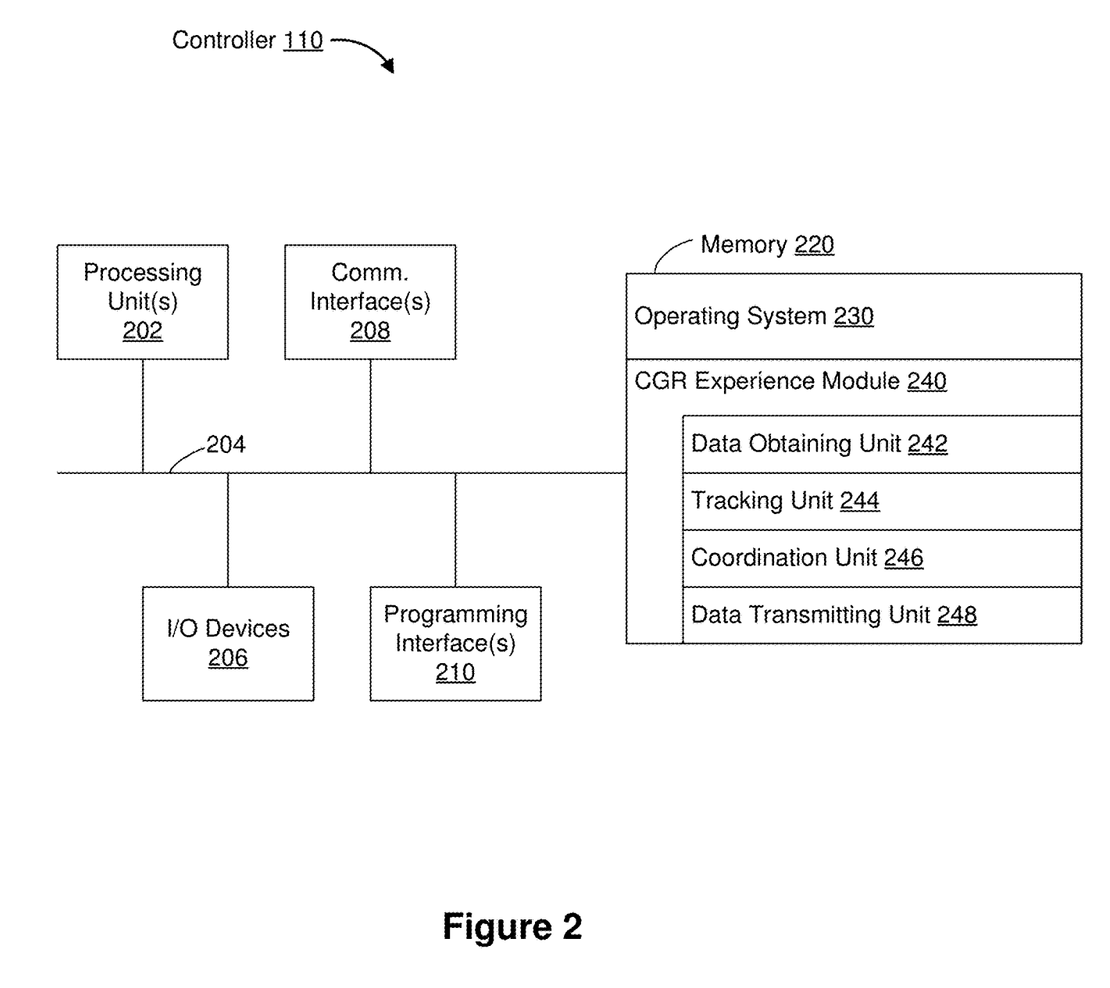
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

In various implementations, the data transmitting unit 248 is configured to decompose a video stream into a plurality of frequency band video stream and encode (and transmit) each frequency band video stream at a respective frequency band bit rate.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
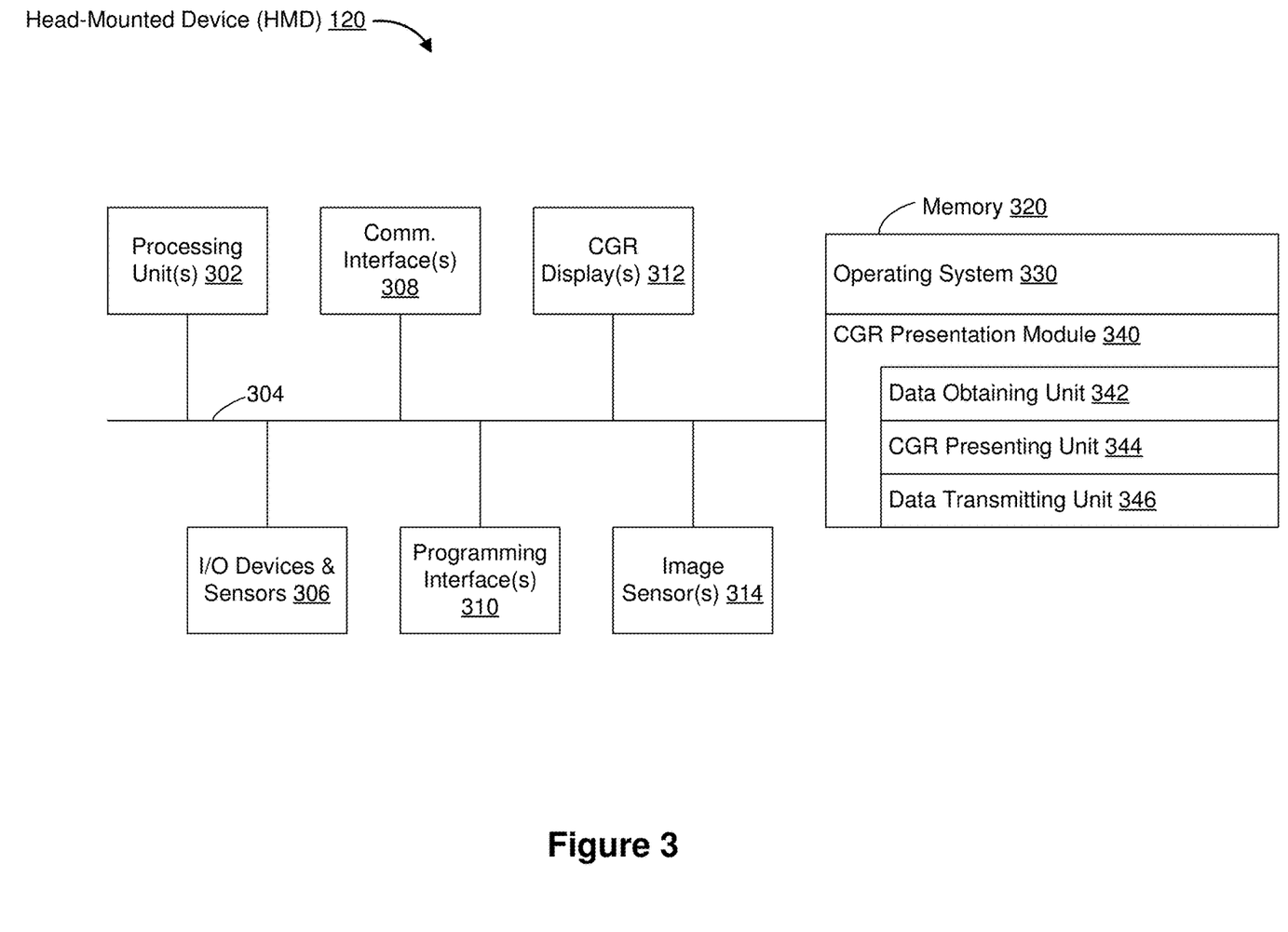
FIG. 3 is a block diagram of an example HMD in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting AR and VR content. In some implementations, the one or more CGR displays 312 are capable of presenting AR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR presenting unit 344, and a data transmitting unit 346.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the CGR presenting unit 344 is configured to present CGR content via the one or more CGR displays 312. To that end, in various implementations, the CGR presenting unit 344 includes instructions and/or logic therefor, and heuristics and metadata therefor.

In some implementations, the data transmitting unit 346 is configured to transmit data (e.g., presentation data, location data, etc.) to at least the controller 110. To that end, in various implementations, the data transmitting unit 346 includes instructions and/or logic therefor, and heuristics and metadata therefor.

Although the data obtaining unit 342, the CGR presenting unit 344, and the data transmitting unit 346 are shown as residing on a single device (e.g., the HMD 120), it should be understood that in other implementations, any combination of the data obtaining unit 342, the CGR presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
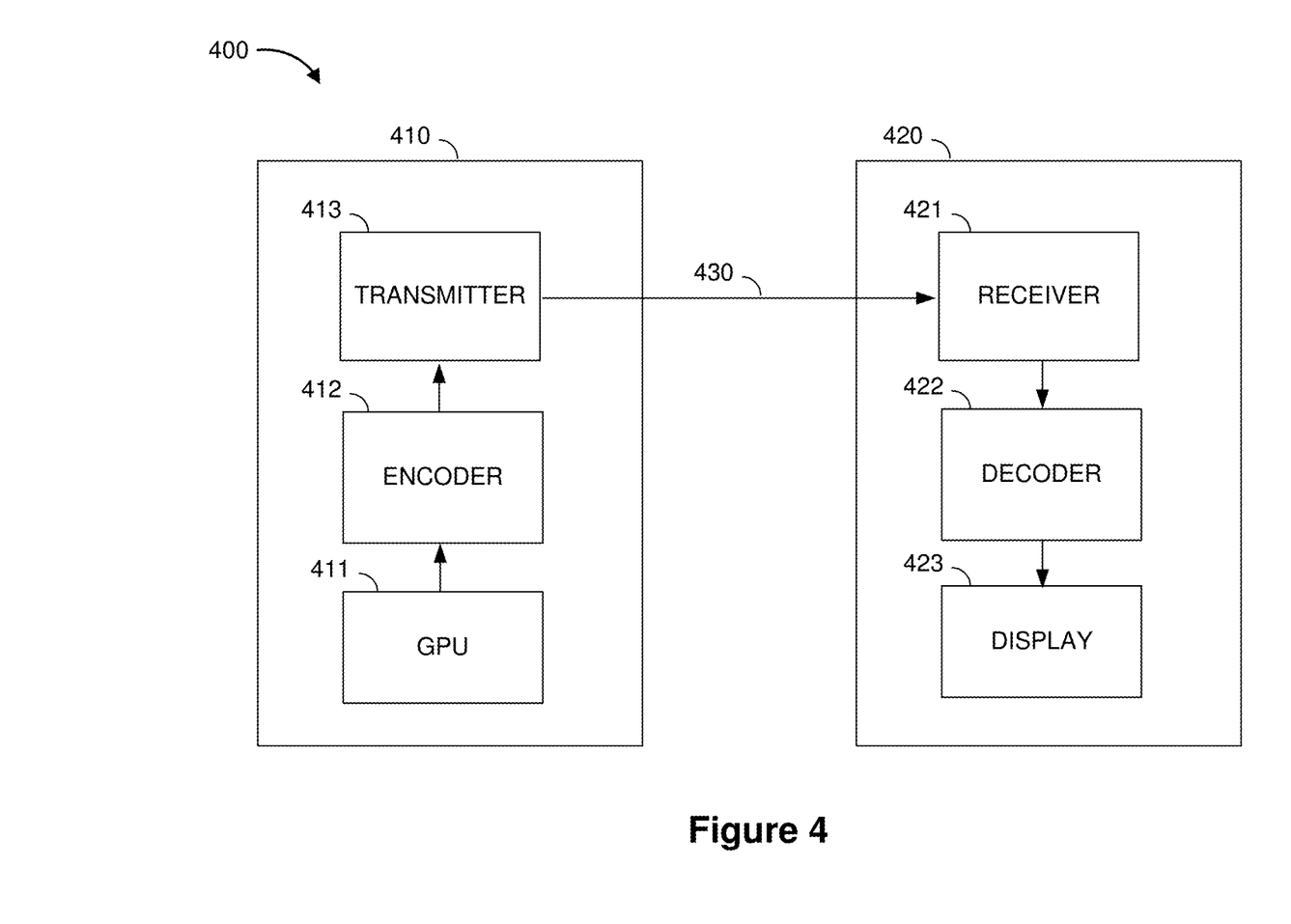
FIG. 4 illustrates an example operating video communications environment 400 in accordance with some implementations.

FIG. 4 illustrates an example operating video communications environment 400 in accordance with some implementations. The video communications environment includes a video transmitter 410 (which, in some embodiments, corresponds to the controller 110 of FIG. 1) and a video receiver 420 (which, in some embodiments, corresponds to the HMD 120 of FIG. 1). The video transmitter 410 transmits a bit stream encoding video data to the video receiver 420 over a channel 430 (which, in some embodiments, corresponds to the one or more communications channels 144 of FIG. 1).

The video transmitter 410 includes a graphics processing unit (GPU) 411 that generates (or processes) video data to generate a video stream. The video transmitter 410 includes an encoder 412 that encodes the video stream into a bit stream. The video transmitter 410 includes a transmitter 413 that transmits the bit stream over the channel 430.

The video receiver 420 includes a receiver 421 that receives the bit stream over the channel 430. The video receiver 420 includes a decoder 422 that decodes the bit stream to reconstruct the video stream. The video receiver 420 includes a display 423 that displays the video stream to a user.

Figure 5:
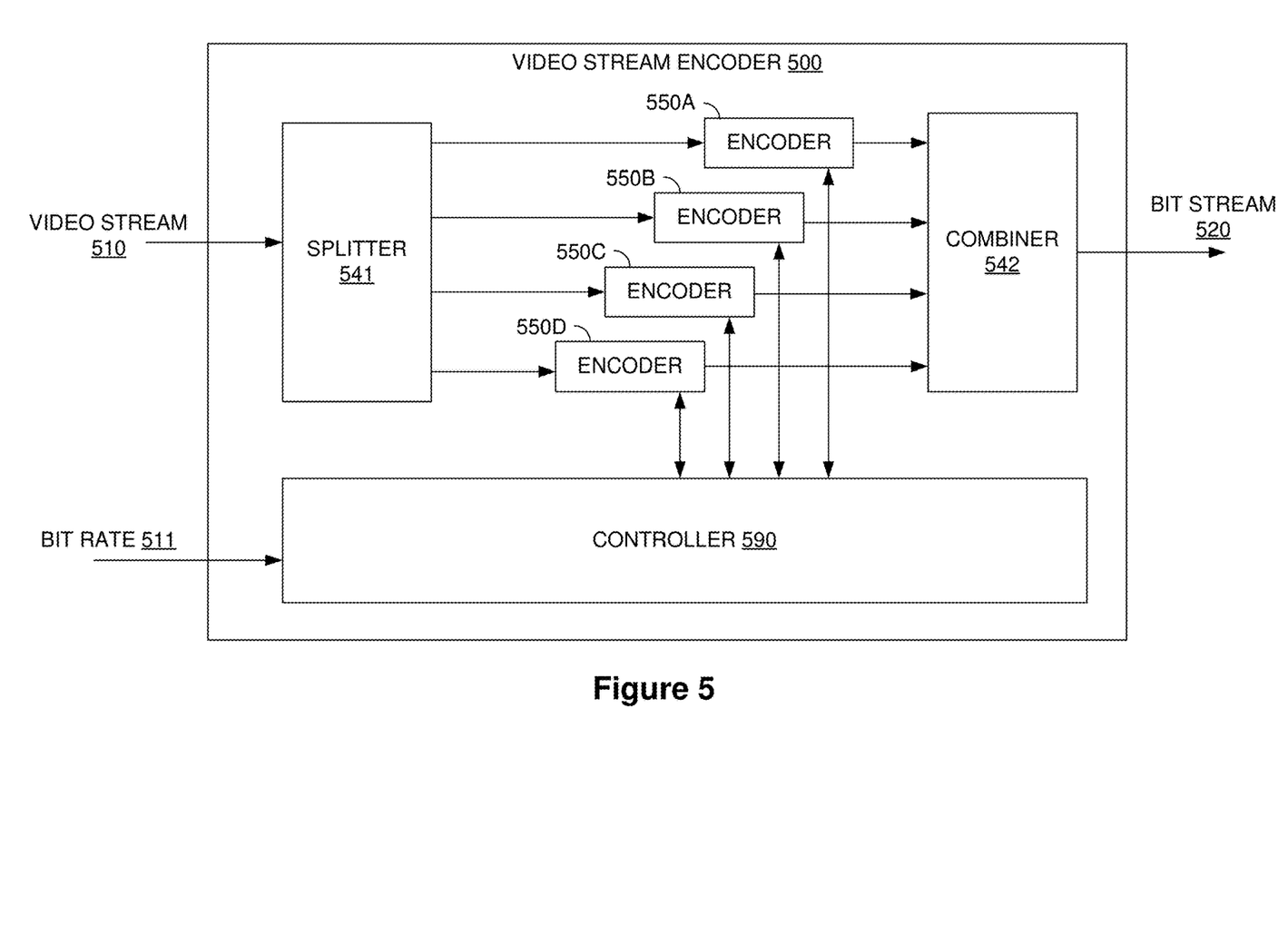
FIG. 5 illustrates a functional block diagram of a video stream encoder in accordance with some implementations.

FIG. 5 illustrates a functional block diagram of a video stream encoder 500 in accordance with some implementations. In some embodiments, the video stream encoder 500 corresponds to the encoder 412 of FIG. 4. The video stream encoder 500 receives, as inputs, a video stream 510 and a target bit rate 511. The video stream encoder 500 produces, as an output, a bit stream 520 encoding the video stream 510. In various implementations, the target bit rate 511 is determined based on a measurement of a channel over which the bit stream 520 is to be transmitted (e.g., the channel 430 of FIG. 4).

Figure 6A:
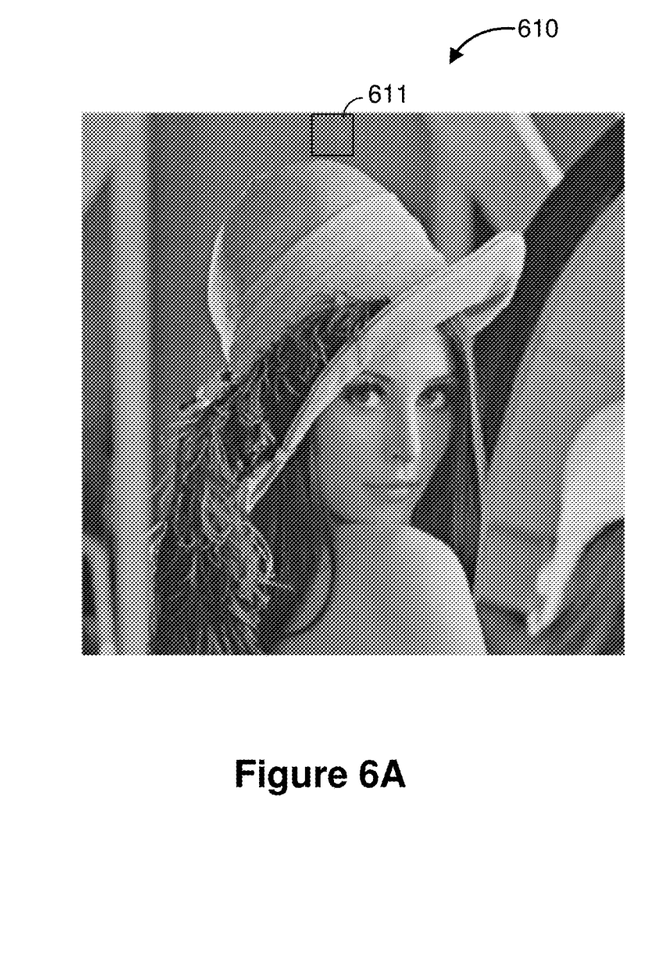
FIG. 6A illustrates an example image.
Figure 6B:
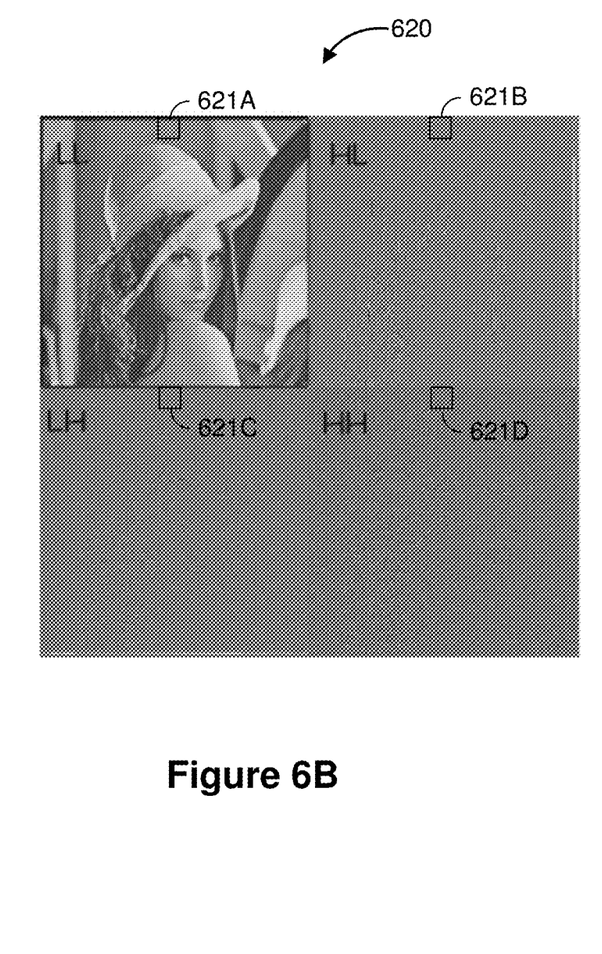
FIG. 6B illustrates a one-layer wavelet image generated by a one-layer wavelet transform of the example image of FIG. 6A.

The video stream encoder 500 includes a splitter 541 that decomposes the video stream into a plurality of frequency band video streams. FIG. 6A illustrates an example image 610. FIG. 6B illustrates a one-layer wavelet image 620 generated by a one-layer wavelet transform of the example image 610. Each portion of the example image 610 (e.g., the top middle block 611) is represented by a plurality of portions (e.g., blocks 621A-621D) of the one-layer wavelet image 620 corresponding to different frequency bands. In particular, block 621A (in the LL component) corresponds to low-frequency in both the horizontal and vertical directions, block 621B (in the HL component) corresponds to high-frequency in the horizontal direction and low-frequency in the vertical direction, block 621C (in the LH component) corresponds to low-frequency in the horizontal direction and high-frequency in the vertical direction, and block 621D (in the HH component) corresponds to high-frequency in both the horizontal and vertical directions.

Figure 6C:
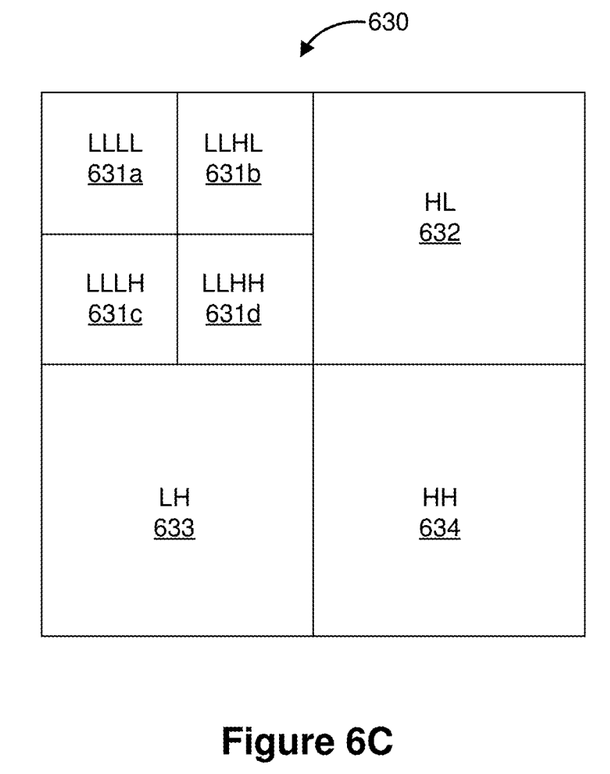
FIG. 6C illustrates a two-layer wavelet image generated by a two-layer wavelet transform of the example image of FIG. 6A.

FIG. 6C illustrates a two-layer wavelet image 630 generated by a two-layer wavelet transform of the example image 610, e.g., by applying a one-layer wavelet transform to the LL component of the wavelet image 620. The two-layer wavelet image includes an LLLL component 631A, an LLHL component 631B, an LLLH component 631C, an LLHH component 631D, an HL component 632, an LH component 633, and an HH component 634.

Referring to FIG. 5, in various implementations, the splitter 541 applies a one-layer wavelet transform to the video stream 510 to generate four frequency band video streams, e.g., an LL video stream, an LH video stream, an HL video stream, and an HH video stream.

In various implementations, the splitter 541 applies a two-level wavelet transform to the video stream 510 to generate seven frequency band video streams, e.g., an LLLL video stream, an LLLH video stream, an LLHL video stream, an LLHH video stream, an LH video stream, an HL video stream, and an HH video streams.

Each frequency band video stream is provided to a respective frequency band video stream encoder 550A-550D. Each frequency band video stream encoder 550A-550D encodes its respective frequency band video stream at a respective frequency band bit rate indicated by a control signal received from a controller 590, producing a respective frequency band bit stream. A combiner 542 receives the frequency band bit streams and combines them (e.g., via concatenation) into the bit stream 520.

The controller 590 receives the target bit rate 511 and, based on the target bit rate 511, generates control signals provided to each of the frequency band video stream encoders 550A-550D indicative of the respective frequency band bit rates.

In various implementations, the controller 590 determines the frequency band bit rates to minimize a mean-square error (MSE) of the bit stream 520 with respect to the video stream 510 subject to the constraint that the bit rate of the bit stream 520 equals (or is at least close to) the target bit rate 511.

Thus, in various implementations, the controller 590 determines the frequency band bit rates according to the following equation, wherein $b_p$ is the frequency band bit rate for frequency band video stream p of P frequency band video streams, MSE is the mean-square error of the bit stream 520, B is the target bit rate 511, f is a cost function, and μ is a Lagrange multiplier (which is a function of the target bit rate 511):

$$b_p = \mathrm{argmin}\left(MSE + \mu(B)f\left(\sum_{p=1}^{P} b_p - B\right)\right)$$

In various implementations, the cost function is a linear function of its argument. In various implementations, the cost function is a nonlinear function of its argument. For example, in various implementations, the cost function penalizes the bit rate of the bit stream 520 being greater than the target bit rate 511 more than the cost function penalizes the bit rate of the bit stream 520 being less than the target bit rate 511. Thus, in various implementations, the cost function penalizes overshoot more than undershoot.

In various implementations, the mean-square error is the weighted sum of the mean-square error for each frequency band video stream (which is a function of a quality parameter). Thus, in various implementations, the mean-square error is defined by the following equation, wherein $QP_p$ is the quality parameter for frequency band videos stream p, $MSE_p$ is the mean-square error for frequency band video stream p (which is a function of $QP_p$), and $w_p$ is the weight for frequency band video stream p:

$$MSE = \sum_{p=1}^{P} w_p MSE_p(QP_p)$$

In various implementations, the weights for the frequency band video streams are determined based on the particular decomposition performed by the splitter 541. For example, in various implementations (e.g., a two-layer wavelet transform), the weights are given as provided in the following table:

| | |
|---|---|
| LLLL | 0.4975 |
| LLLH | 0.1649 |
| LLHL | 0.1649 |
| LLHH | 0.0691 |
| LH | 0.5744 |
| HL | 0.5744 |
| HH | 0.14443 |

In various implementation, the bit rate for each frequency band video stream is also a function of the quality parameter. Combining the equations above, in various implementations, the controller 590 determines the quality parameter for each frequency band according to the following:

$$QP_p = \mathrm{argmin}\left(\sum_{p=1}^{P} w_p MSE_p(QP_p) + \mu(B)f\left(\sum_{p=1}^{P} b_p(QP_p) - B\right)\right)$$

As noted above, both the mean-square error for a frequency band video stream and the bit rate for the frequency band video stream are functions of a quality parameter of the frequency band video stream.

In various implementations, the bit rate for a frequency band video stream is modeled by the following equation, wherein $\alpha_1$ is a first scaling parameter, $g_1$ is a first function of the quality parameter, $\mathrm{var}_p$ is the pixel variance of the frequency component of a frame of the video stream 510 (corresponding to the frequency band video stream p), and $g_2$ is a second function of the pixel variance:

$$b_p = \alpha_1 \cdot g_1(QP_p) \cdot g_2(\mathrm{var}_p)$$

In various implementations, the first function of the quality parameter results in values that are larger for larger values of the quality parameter. In various implementations, the second function of the variance results in values that are larger for larger values of the variance.

In various implementations, the mean pixel value, $I_{mean}$, for an M×N frequency component of a frame of the video stream 510 is determined as follows, wherein $I_p(m,n)$ is the pixel value at location (m,n) of the frequency component of the frame of the video stream 510:

$$I_{mean} = \frac{1}{MN} \sum_{m=1}^{M} \sum_{n=1}^{N} I_p(m, n)$$

Further, the pixel variance of the frequency component of the frame of the video stream 510 is determined as follows:

$$\mathrm{var}_p = \frac{1}{MN} \sum_{m=1}^{M} \sum_{n=1}^{N} (I_p(m, n) - I_{mean})^2$$

In various implementations, the mean-square error for a frequency band video stream is modeled by the following equation, wherein $\alpha_2$ is a second scaling parameter, $g_3$ is a third function of the quality parameter, $\mathrm{grad}_p$ is the mean pixel gradient of the frequency component of a frame of the video stream 510 (corresponding to the frequency band videos stream p), and $g_4$ is a second function of the mean pixel gradient:

$$MSE_p = \alpha_2 \cdot g_3(QP_p) \cdot g_4(\mathrm{grad}_p)$$

In various implementations, the third function of the quality parameter results in values that are smaller for larger values of the quality parameter. In various implementations, the fourth function of the mean pixel gradient results in values that are larger for larger values of the mean pixel gradient.

In various implementations, the mean pixel gradient of the frequency component of the frame of the video stream 510 is determined as follows:

$$\mathrm{grad}_p = \frac{1}{2(M-1)(N-1)} \sum_{m=1}^{M-1} \sum_{n=1}^{N-1} |I_p(m, n) - I_p(m+1, n)| + |I_p(m, n) - I_p(m, n+1)|$$

Thus, the controller determines the quality parameters for each frequency band based on statistics regarding the frequency components of a frame of the video stream 510. In various implementations, the controller 590 obtains the statistics of a current frame to be encoded by the frequency band encoders 550A-550D. In various implementations, the controller 590 obtains the statistics of a previous frame (e.g., receives the statistics from the frequency band encoders 550A-550D).

Once the controller 590 determines the quality parameter for each frequency band video stream, the controller 590 determines the frequency band bit rate for each frequency band video stream and provides them to their respective frequency band encoder 550A-550D via respective control signals. In response, the frequency band encoders 550A-550D encode the frequency band video streams at the frequency band bit rates. The encoded frequency band video streams (e.g., frequency band bit streams) are combined by the combiner 542 and transmitted.

In various implementations, the controller 590, rather than receiving a single target bit rate B, receives frequency band target bit rates for each frequency band, $B_p$. For example, in various implementations, the LLLL frequency band video stream may have a higher target bit rate than the LLHH frequency band video stream. In various implementations, the frequency band target bit rates are determined based on a measurement of the channel and an unequal protection heuristic.

Accordingly, in various implementations, the controller 590 determines the quality parameter for each frequency band video stream according to the following:

$$QP_p = \mathrm{argmin}\left( \sum_{p=1}^{P} w_p MSE_p(QP_p) + \mu f\left( \sum_{p=1}^{P} \frac{b_p(QP_p)}{B_p} - 1 \right) \right)$$

In various implementations, in addition to decomposing the video stream 510 in frequency into a plurality of frequency band video streams, the splitter 541 decomposes the video stream in space into a plurality of slice video streams, each representing a spatial component (e.g., a slice or tile) of the video stream 510.

In various implementations, the respective frequency band encoders 550A-550D encode slice video streams at a bit rate based on control signal (provided by the controller 590) the complexity of the slice video stream. Accordingly, portions of the video stream 510 which are more complex are encoded with an increased number of bits than they would be encoded if their complexity were not accounted for.

Figure 7:
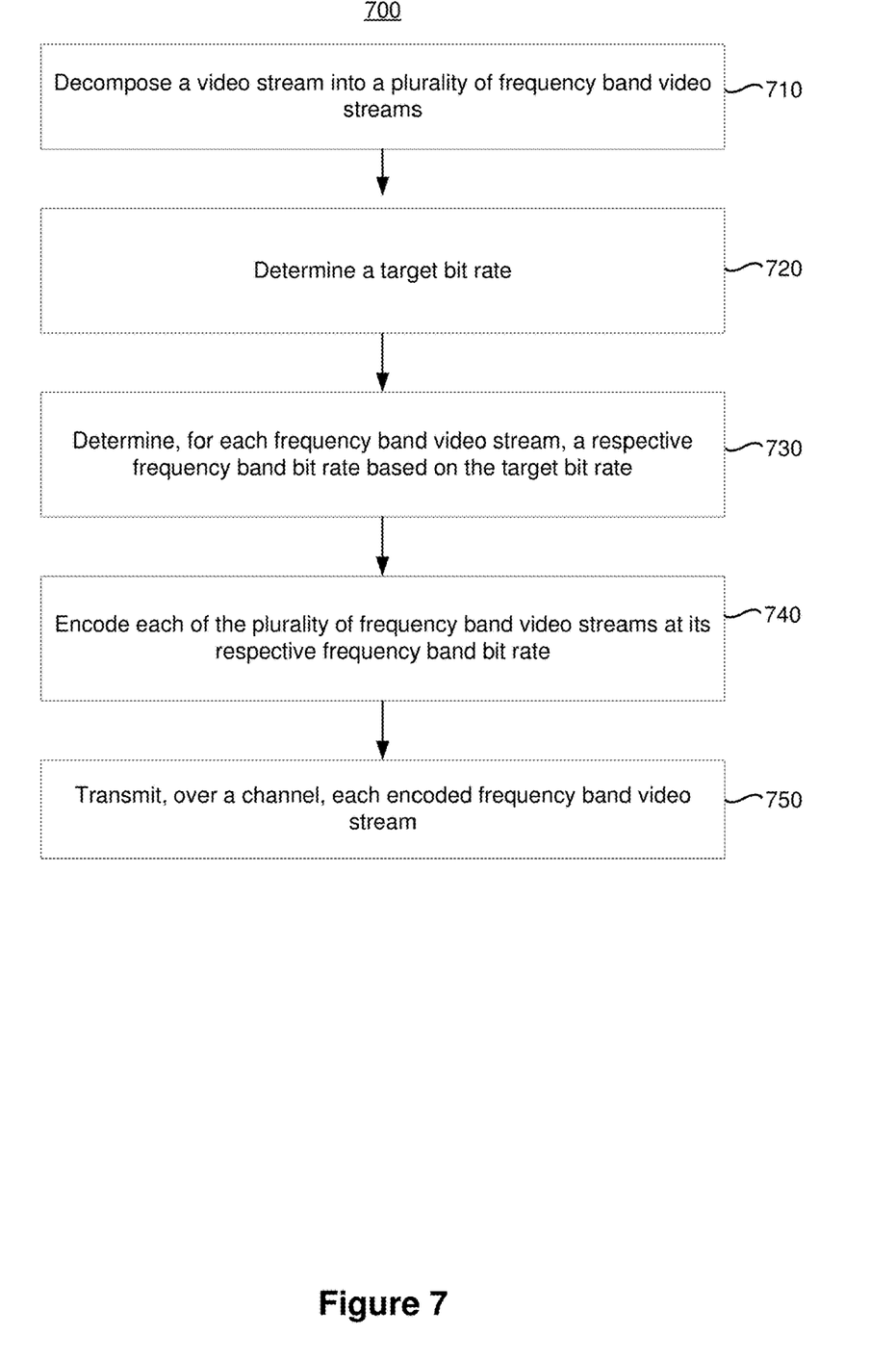
FIG. 7 is a flowchart representation of a method of transmitting a bit stream encoding a video stream in accordance with some implementations.

FIG. 7 is a flowchart representation of a method 700 of transmitting a bit stream encoding a video stream in accordance with some implementations. In various implementations, the method 700 is performed by a device with one or more processors and non-transitory memory (e.g., the controller 110 of FIG. 1). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory). Briefly, in some circumstances, the method 700 includes decomposing a video stream into a plurality of frequency band video streams and encoding (and transmitting) each frequency band video stream at a respective frequency band bit rate.

The method 700 begins, in block 710, with the device decomposing a video stream into a plurality of frequency band video streams. In various implementations, the device decomposes the video stream by applying a wavelet transform to the video stream (e.g., applying a wavelet transform to each frame of the video stream). Thus, in various implementations, the plurality of frequency band video streams includes an LL video stream, an LH video stream, an HL video stream, and an HH video stream. In various implementations, the device decomposes the video stream by applying a two-layer wavelet transform to the video stream (e.g., applying a two-layer wavelet transform to each frame of the video stream). Thus, in various implementations, the plurality of frequency band video streams includes an LLLL video stream, an LLLH video stream, an LLHL video stream, an LLHH video stream, an LH video stream, an HL video stream, and an HH video stream.

In various implementations, in addition to decomposing the video stream in frequency, the device further decomposes the video stream in space into a plurality of slice video streams.

The method 700 continues, at block 720, with the device determining a target bit rate. In various implementations, the device determines the target bit rate based on a measurement of the channel. In various implementations, the device determines a target bit rate (e.g., a frequency band target bit rate) for each frequency band video stream.

The method 700 continues, at block 730, with the device determining, for each frequency band video stream, a respective frequency band bit rate based on the target bit rate. In various implementations, the device determines the respective frequency band bit rates to minimize a mean-square error. In various implementations, the device determines a respective quality parameter for each of the frequency band video streams and determines the frequency band bit rates based on the respective quality parameters. In various implementations, the device determines the respective quality parameter for a particular frequency band video stream based on statistics of a frame of the particular frequency band video stream (e.g., a current frame or previous frame of the particular frequency band video stream). In various implementations, the statistics includes a mean pixel gradient and a pixel variance.

In various implementations, the device determines the respective frequency band bit rates based on a cost function. In various implementations, the cost function penalizes the sum of the respective frequency band bit rates being greater than the target bit rate more than the cost function penalizes the sum of the respective frequency band bit rates being less than the target bit rate.

The method 700 continues, at block 740, with the device encoding each of the plurality of frequency band video streams at its respective frequency band bit rate. In various implementations, the method 700 includes determining a complexity of a particular one of a plurality of slice video streams and encoding (in block 740) the particular one of the plurality of slice video streams at a bit rate based on the complexity.

The method 700 continues, at block 750, with the device transmitting, over a channel, each encoded frequency band video stream.

In various implementations, a packet transmitted by the device (in block 750) is not received by the receiver (e.g., the packet is dropped or lost). Accordingly, in various implementations, the device retransmits, over the channel, a packet of an encoded frequency band video stream. In various implementations, the decision to retransmit a packet is based on the frequency band of the video stream. Accordingly, in various implementations, a low-frequency packet (e.g., a packet from a LLLL video stream) is more likely to be retransmitted than a high-frequency packet (e.g., a packet from an HH video stream). In various implementations, the probability of retransmission is proportional to the weights given in the table above. Thus, in various implementations, the method 700 further includes retransmitting one or more packets lost in transmitting each encoded frequency band video stream based on the frequency band of the frequency band video stream.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including one or more processors, non-transitory memory, and a transmitter:
        decomposing a video stream into a plurality of video streams, wherein each of the plurality of video streams is associated with a different frequency band;
        determining a target bit rate based on a measurement of a transmission channel;
        determining, for each of the plurality of video streams, a respective video quality parameter;
        determining, for each of the plurality of video streams, a respective mean-square-error (MSE) based on the respective video quality parameter;
        determining, for each of the plurality of video streams, a respective frequency band bit rate based on the target bit rate and the respective MSE, wherein the respective frequency band bit rate is within a threshold of the target bit rate and the respective frequency band bit rate reduces the respective MSE;
        encoding each of the plurality of video streams at its respective frequency band bit rate; and
        transmitting, via the transmitter, each of the plurality of encoded video stream over the transmission channel.

2. The method of claim 1, wherein decomposing the video stream into the plurality of video streams includes applying a wavelet transform to the video stream.

3. The method of claim 2, wherein decomposing the video stream into the plurality of video streams includes applying a two-layer wavelet transform to the video stream.

4. The method of claim 1, further comprising decomposing each of the plurality of video streams into a respective plurality of slice video streams.

5. The method of claim 4, further comprising:
    determining a complexity of a particular one of the plurality of slice video streams; and
    encoding the particular one of the plurality of slice video streams at a bit rate based on the complexity.

6. The method of claim 1, wherein determining the respective video quality parameter for a particular video stream is based on statistics of a frame of the particular video stream.

7. The method of claim 6, wherein the statistics include a mean pixel gradient and a pixel variance.

8. The method of claim 1, wherein determining the respective frequency band bit rates based on the target bit rate is based on a cost function that penalizes a sum of the respective frequency band bit rates being greater than the target bit rate more than the cost function penalizes the sum of the respective frequency band bit rates being less than the target bit rate.

9. The method of claim 1, further comprising retransmitting one or more packets lost in transmitting each encoded video stream based on the frequency band of the video stream.

10. The method of claim 1, wherein the respective video quality parameter for a particular video stream among the plurality of video streams is a function of a weight assigned to the particular video stream and an error rate for the particular video stream.

11. The method of claim 1, wherein the respective video quality parameter for each of the plurality of video streams indicates a video quality associated with one or more video frames of a corresponding one of the plurality of video streams.

12. The method of claim 1, wherein determining the respective frequency band bit rate is based on a cost function, and wherein the cost function penalizes the respective frequency band bit rate by an amount that is based on how much the respective frequency band bit rate exceeds the target bit rate.

13. A device comprising:
a transmitter;
one or more processors;
non-transitory memory; and
one or more programs stored in the non-transitory memory, which, when executed by the one or more processors, cause the device to:
  decompose a video stream into a plurality of video streams wherein each of the plurality of video streams is associated with a different frequency band;
  determine a target bit rate based on a measurement of a transmission channel;
  determine, for each of the plurality of video streams, a respective video quality parameter;
  determine, for each of the plurality of video streams, a respective mean-square-error (MSE) based on the respective video quality parameter;
  determine, for each of the plurality of video streams, a respective frequency band bit rate based on the target bit rate and the respective MSE, wherein the respective frequency band bit rate is within a threshold of the target bit rate and the respective frequency band bit rate reduces the respective MSE;
  encode each of the plurality of video streams at its respective frequency band bit rate; and
  transmit, via the transmitter, each of the plurality of encoded video streams over the transmission channel.

14. The device of claim 13, wherein decomposing the video stream into the plurality of video streams includes applying a wavelet transform to the video stream.

15. The device of claim 13, wherein the one or more programs further cause the device to decompose each of the plurality of video streams into a respective plurality of slice video streams.

16. The device of claim 15, wherein the one or more programs further cause the device to:
  determine a complexity of a particular one of the plurality of slice video streams; and
  encode the particular one of the plurality of slice video streams at a bit rate based on the complexity.

17. The device of claim 13, wherein the determining respective video quality parameter for a particular video stream based on statistics of a frame of the particular video stream.

18. The device of claim 17, wherein the statistics include a mean pixel gradient and a pixel variance.

19. A non-transitory computer-readable medium having instructions encoded thereon which, when executed by one or more processors of a device including a transmitter, cause the device to:
  decompose a video stream into a plurality of video streams, wherein each of the plurality of video streams is associated with a different frequency band;
  determine a target bit rate based on a measurement of a transmission channel;
  determine, for each of the plurality of video streams, a respective video quality parameter;
  determine, for each of the plurality of video streams, a respective mean-square-error (MSE) based on the respective video quality parameter;
  determine, for each of the plurality of video streams, a respective frequency band bit rate based on the target bit rate and the respective MSE, wherein the respective frequency band bit rate is within a threshold of the target bit rate and the respective frequency band bit rate reduces the respective MSE;
  encode each of the plurality of video streams at its respective frequency band bit rate; and
  transmit, via the transmitter, each of the plurality of encoded video stream over the transmission channel.

20. The non-transitory computer-readable medium of claim 19, wherein decomposing the video stream into the plurality of video streams includes applying a wavelet transform to the video stream.

* * * * *